(12) United States Patent
Tomasini

(10) Patent No.: US 11,988,578 B2
(45) Date of Patent: May 21, 2024

(54) PNEUMATIC LEAK MEASUREMENT SYSTEM BASED ON ABSOLUTE PRESSURE DROP MEASUREMENT, WITH REFERENCE SAMPLE DIFFERENTIAL COMPENSATION

(71) Applicant: FORTEST EUROPE SAGL, Lugano (CH)

(72) Inventor: Alessandro Tomasini, Lugano (CH)

(73) Assignee: FORTEST EUROPE SAGL, Lugano (CH)

( * ) Notice: Subject to any disclaimer, the term of this patent is extended or adjusted under 35 U.S.C. 154(b) by 489 days.

(21) Appl. No.: 17/413,535

(22) PCT Filed: Dec. 24, 2019

(86) PCT No.: PCT/IB2019/061340
§ 371 (c)(1),
(2) Date: Jun. 12, 2021

(87) PCT Pub. No.: WO2020/136582
PCT Pub. Date: Jul. 2, 2020

(65) Prior Publication Data
US 2022/0057289 A1  Feb. 24, 2022

(30) Foreign Application Priority Data
Dec. 27, 2018  (CH) ..................................... 01609/18

(51) Int. Cl.
*G01M 3/32* (2006.01)
*G01L 13/00* (2006.01)

(52) U.S. Cl.
CPC ........... *G01M 3/3263* (2013.01); *G01L 13/00* (2013.01)

(58) Field of Classification Search
CPC .... G01M 3/3263; G01M 3/3272; G01L 13/00
See application file for complete search history.

(56) References Cited

U.S. PATENT DOCUMENTS

| 5,142,483 A * | 8/1992 | Basham ............... G05D 16/204 700/282 |
| 9,638,559 B1 | 5/2017 | Zummo et al. |
| 2009/0132185 A1* | 5/2009 | Furuse ................ G01M 3/3263 702/51 |
| 2016/0018288 A1* | 1/2016 | Eckhardt .............. B01D 46/446 702/50 |
| 2018/0259421 A1* | 9/2018 | Schindler ............ G01M 3/3254 |

FOREIGN PATENT DOCUMENTS

DE            102 42 491 A1    5/2003

* cited by examiner

*Primary Examiner* — Tung S Lau
(74) *Attorney, Agent, or Firm* — John Alumit

(57) ABSTRACT

The present invention specifically relates to the pneumatic and electronic application of a pneumatic leak meter based on absolute pressure drop measurement having the peculiarity of compensating for ambient variations such as ambient temperature and temperature of the measured part, as well as mechanical deformations of the component being tested caused by the pressure being applied.

3 Claims, 2 Drawing Sheets

PNEUMATIC LEAK MEASUREMENT SYSTEM BASED ON ABSOLUTE PRESSURE DROP MEASUREMENT, WITH REFERENCE SAMPLE DIFFERENTIAL COMPENSATION

FIELD OF APPLICATION OF THE INVENTION

The present invention specifically relates to the pneumatic and electronic application of a pneumatic leak meter based on absolute pressure drop measurement having the peculiarity of compensating for ambient variations such as ambient temperature and temperature of the measured part, as well as mechanical deformations of the component being tested caused by the pressure being applied.

STATE OF THE ART

According to the detailed classification in standard EN1779, the instruments used for leak testing fall into two basic categories, namely:
- tracer gas systems or leak location,
- air/air meters of the ATE type (ATE being the acronym for Automatic Test Equipment).

In the field of air/air ATE instrumentation, two types of measurement systems based on pressure drop measurement predominantly come into consideration, namely those based on absolute pressure drop measurement of the test part and those based on differential pressure drop measurement of the test part.

Both systems calculate the leak rate by measuring pressure decay over time, which can be expressed by the following function:

$$\text{Leak} = dp/dt$$

Meters of the "absolute pressure drop" type calculate the leak by analysing the "direct" pressure decay, i.e. after completion of the filling/pressurization phase, the branch being measured is isolated hermetically using a leak-free valve, enabling the equipment to analyse any possible pressure drop of the object being tested.

Meters of the "differential pressure drop" type perform a similar measurement, but compare the pressure decay of the object being tested with a hermetic sample volume referred to as "reference part".

Unlike absolute pressure drop systems, differential pressure drop systems use a second differential pressure transducer, and the whole pneumatic circuit is more complex due to the low sensitivity (or resolution accuracy) of past pressure sensors. Indeed, a characteristic of the pressure drop over time (dp/dt) is that the smaller the appreciable difference in pressure (dp), the greater the sensitivity, speed and accuracy of the measurement.

For this reason, as early as in the 1970s, it was possible to produce differential pressure drop meters with a resolution capability of tenths of Pascals, which was not achievable at the time using absolute pressure drop systems.

Furthermore, as a result of the use of differential transducers, the processing and management electronics of this equipment was, at the time, extremely simplified, the measurement having no offset and being indeed "central zero".

Conversely, and in parallel with the development of industrial force and weight measurements, the quality of pressure measurements and pressure transducers has improved significantly over the years, such that today it is possible to obtain the same measurement resolution, even with very high offset values, as is the case with leak measurements of the "absolute pressure drop" type.

The application of microprocessors and related calculation and compensation algorithms have led, over time, to performances of measurements of the "absolute pressure drop" type that are more than comparable with measurements of the "differential pressure drop" type, thereby simplifying the pneumatic sections and improving the overall reliability of the measurement systems.

There nonetheless remains an intrinsic benefit in circuitry of the "differential" type, which is related to the partial (or apparent) common-mode compensation of the measurements; in fact, all pressure decay measurement systems implies the Gay-Lussac law of ideal gases:

$$pV = nRT$$

from which it can be inferred that thermal variances of the environment or of the test part cause errors and drift in the measurement.

For this reason, differential pressure drop meters enable compensation, precisely by virtue of the common-mode elision of two components being measured (namely the part being tested and the reference part) under the same thermal conditions.

It is clear, however, that the volume variances caused by expansions of the two components being tested in turn cause measurement errors. Indeed, in a differential pressure drop system, commonly intended for industrial production, with a high operating frequency, the mechanical expansion of the component being tested is understood to be limited to the measurement operation only, while the mechanical stress on the reference sample part will accumulate for the entire usage time of the equipment to an indefinite number of times, ultimately leading to a continuous drift of the behaviour between the two parts—typically—after just 15/30 minutes of work at steady regime.

Similarly, as a result of the continuous pressurization and emptying of the single reference sample part, there is an increasing thermal accumulation that triggers endogenous thermal effects, thereby partially nullifying the effect of thermal compensation.

In practice, empirical surveys have shown that a metal component with a volume of 300 cc subjected to a relative pressure of 2 bar requires at least 20 minutes in order to restore the conditions of elasticity and rest temperature, namely return to a repeatability margin of 10% compared to the first test carried out.

For this reason, the concept of apparent repeatability has been introduced, over time, in the use of differential pressure drop meters, namely the phenomenon of good repeatability when taking repeated measurements on the same component, measurement stability that is not however maintained during practical use in production.

As a partial solution to the foregoing, manufacturers have devised different variants of algorithms designed to integrate and average, over time, the trends in tests considered to be "good", namely measurements falling within limits of acceptability, and to use this data to obtain an average trend of what is considered to be the "sample part".

The limitations of all of these analysis systems can be found in the basic incongruity of the concept, namely that the components measured from time to time are not quality standards but rather parts with intrinsic variability.

The practical reason for the unreliability of the aforementioned algorithms can be found in the complexity of the error accumulated during the measurements. In fact, in addition to a temperature and expansion drift, practical application also involves possible elastic phenomena of the systems providing connection to the component being measured, vibrations, and spurious movements during testing.

The accumulation of all of these errors, in practice, significantly limits the use of these filters since the time and level parameters are too different from one another.

PRESENTATION AND ADVANTAGES OF THE INVENTION

In this context, the underlying technical objective of the present invention is to provide a system for measuring pneumatic leaks that overcomes the drawbacks of the prior art mentioned above, which system takes the form of a simple, robust and reliable solution.

This and other objectives are achieved thanks to the features of the invention as set forth in the independent and dependent claims, which outline preferred and/or particularly advantageous aspects of the invention.

In particular, the preferred embodiment of the present invention provides a pneumatic leak measurement system based on differential pressure drop measurement, which system comprises two absolute pressure drop measurement circuits and associated electronics to subtract the pressure values measured by the two measurement circuits one from the other.

Thanks to this solution it is therefore possible to:
  periodically characterize a reference sample of the component being tested in terms of temperature and expansion, however without using intrusive elements causing thermal or mechanical drift,
  obtain the benefits of measurement of the differential type, without the drawbacks of complexity and, especially, of "apparent repeatability".

More specifically, the system according to the invention relies on a traditional high-resolution absolute pressure drop meter combined with a second similar branch connected to a reference component/part, wherein the reference component/part is understood to be a quality, leak-free reference sample.

These objectives and advantages are all achieved thanks to the pneumatic leak measurement system based on absolute pressure drop measurement, with reference sample differential compensation according to the present invention, as characterized in the claims appended hereto.

BRIEF DESCRIPTION OF THE FIGURES

This and other features of the present invention will appear more clearly from reading the following detailed description of embodiments of the invention which are presented solely by way of non-restrictive examples and illustrated by the attached drawings in which.

DESCRIPTION OF THE INVENTION

Figure 1:
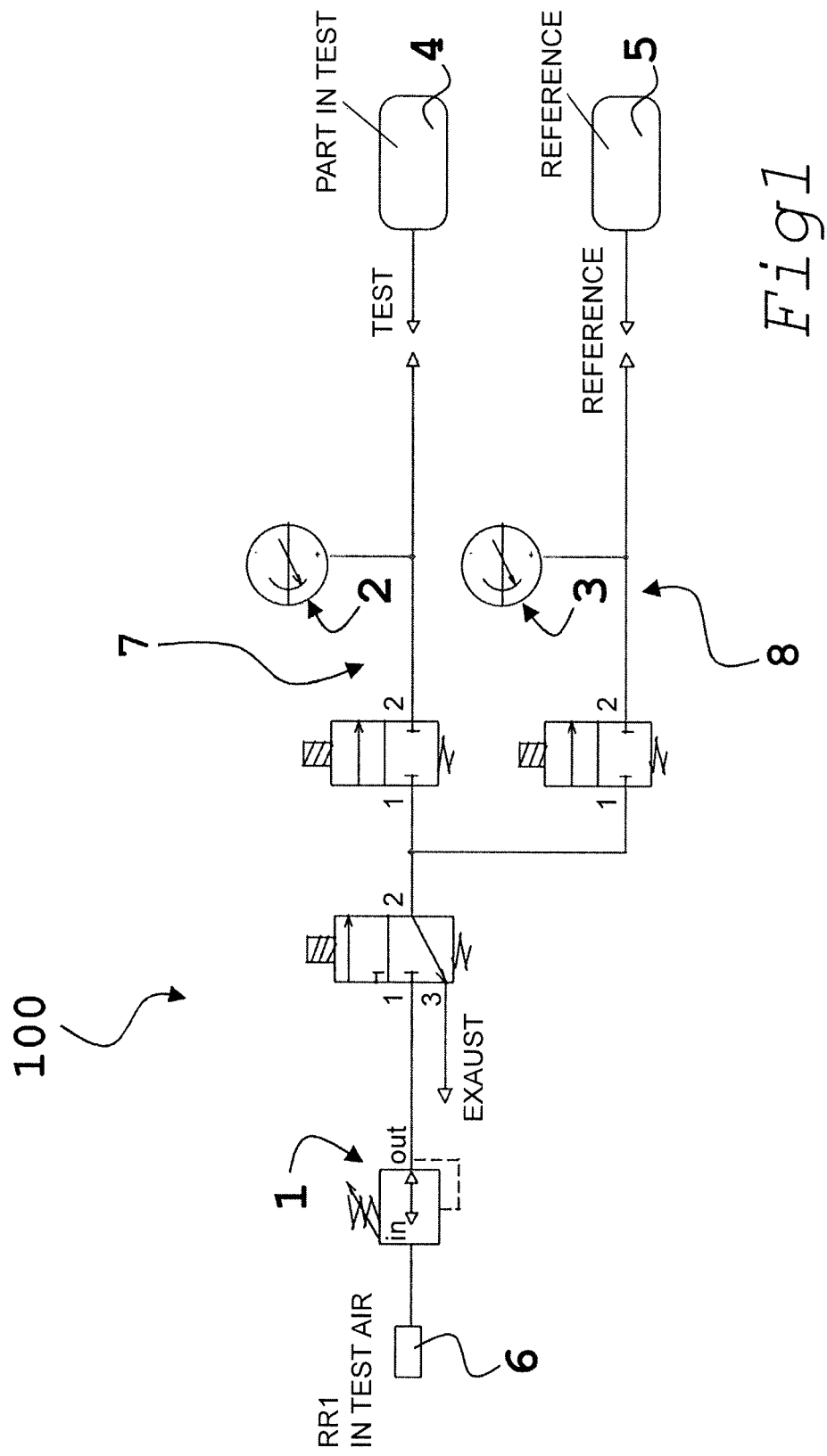
FIG. 1 illustrates a schematic pneumatic diagram of a pneumatic leak measurement system according to an embodiment of the invention.

With particular reference to FIG. 1, reference numeral 100 generally designates the system for measuring pneumatic leaks of an object or part 4 in accordance with an embodiment of the present invention, namely a pneumatic leak meter based on absolute pressure drop measurement that compensates for ambient variations such as ambient temperature and temperature of the part 4 being measured, as well as mechanical deformations of the component being tested caused by pressure being applied, as detailed below.

More specifically, reference numeral 1 designates a pneumatic "filling" or pressurization section of the object 4 being measured.

Industrial air, designated by reference numeral 6 in FIG. 1, is commonly used to carry out the filling or pressurization phase.

As shown in the diagram of FIG. 1, filling or pressurization of the object 4 to be measured is performed via a common pneumatic valve and a first circuit 7. This first circuit 7 includes a dedicated pneumatic valve for selectively coupling the first circuit 7 to the aforementioned pressurization section 1 during the pressurization phase and for selectively decoupling the first circuit 7 from the pressurization section 1 during the measurement phase, as well as a pressure meter 2 connected on the pneumatic line with the part or object 4 to be tested. In that respect, an end portion of the first circuit 7, namely of the pneumatic line thereof, is connectable to the part or object 4 to be tested, as shown.

Filling or pressurization of the test object 4 is monitored over time by the pressure meter 2. In the illustrated embodiment, the pressure meter 2 is a relative pressure meter operating relative to ambient pressure, i.e. the pressure value measured by the pressure meter 2 is measured relative to ambient pressure.

The aforementioned first circuit 7 thus acts as a first absolute pressure drop measurement circuit 7 for the purpose of measuring pressure decay over time of the test object 4.

The system 100 also includes a second absolute pressure drop measurement circuit 8, similar to the first circuit 7, likewise including a dedicated pneumatic valve and a pressure meter 3 connected on the relevant pneumatic line of the circuit 8. Similarly to pressure meter 2, the pressure meter 3 is a relative pressure meter operating relative to ambient pressure.

An end portion of the measurement circuit 8, namely of the pneumatic line thereof, can be connected or not to a reference element or sample 5 as a function of the required measurement, that is:
  in case of symmetrical differential measurement, the reference element/sample 5 is connected to the end portion of the measurement circuit 8;
  in case of asymmetrical differential measurement, the reference element/sample 5 is not connected to the end portion of the measurement circuit 8, which end portion is plugged or kept closed in such case.

Figure 2:
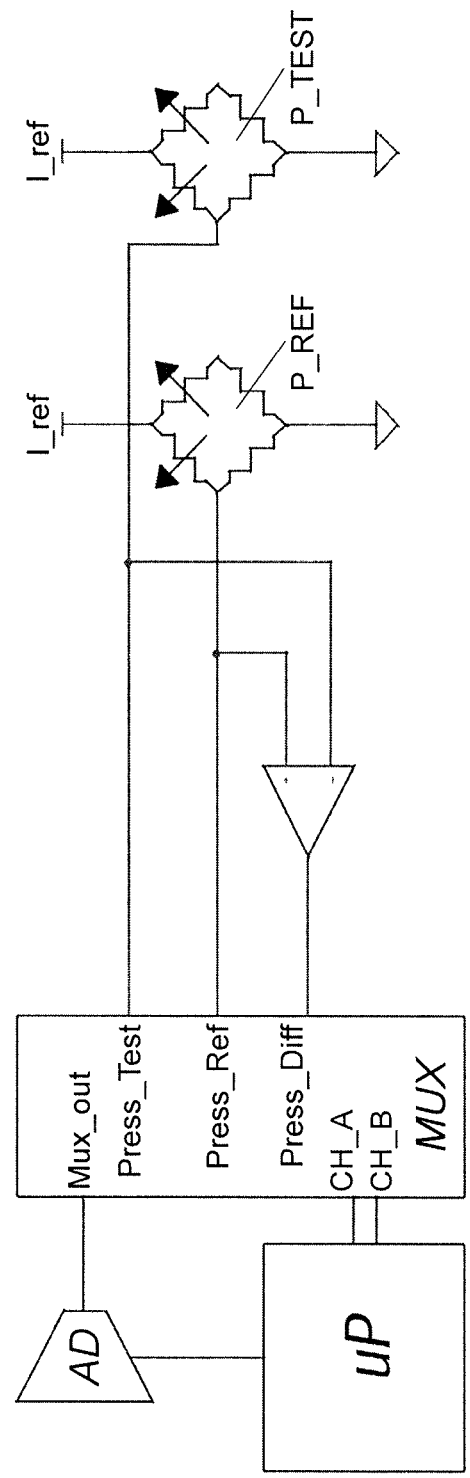
FIG. 2 illustrates basic electronics of the system shown in FIG. 1, configured to acquire two pressure values (P_TEST/Press_Test and P_REF/Press_Ref) and to continuously sample a difference (Press_Diff) between said values.

In the asymmetrical differential measurement mode (with no reference element/sample connected to the measurement circuit 8), the electronics associated with the system 100 of FIG. 1 (see FIG. 2 which shows the basic functionality thereof) are configured to acquire both pressure values measured by the pressure meters 2, 3 (which pressure values are designated in FIG. 2 as test value P_TEST/Press_Test and reference value P_REF/Press_Ref) and therefore to continuously sample the difference between the two pressure values.

Alternatively, in the case of symmetrical measurement (with a hermetic sample/reference part 5 connected to the measurement circuit 8), the electronics associated with the system 100 of FIG. 1 (see again FIG. 2) are configured to:
  acquire, or sample, and save in a permanent data array, a measurement trend of the reference part 5, and determine, during the measurements, a difference in real time between the acquired wave and the saved array, point by point in phase with time.

The aforementioned method ensures that the resulting differential measurement is free from and unaffected by mechanical stress phenomena and variations in ambient temperature.

More specifically, in addition to the associated electronics, the system 100 may further provide for the management of calculations using software such that it is possible to:

measure the trend of the sample reference part 5 at intervals of time, thereby avoiding unnecessary mechanical stresses and heat accumulation;

allow variations in ambient temperature to be "chased" or tracked.

To do so (and also to avoid creating unnecessary downtime in production cycles), via hardware indications of external automations, and internal logic of the instrument, the software may further manage a "reservation" and "execution" cycle of the "reference" sample part, and via percentage parameters of the totality of the measurements taken, as well as minimum and maximum times, take measurement samples at intervals of time that are long enough not to wear out the mechanical characteristics of the reference part, but frequent enough to "chase" or track ambient variations.

Sampling takes place in any case each time the system is turned on, and special "average" algorithms on the acquired points enable the different reference curves acquired to be refined over time and filtered, while avoiding any sudden and unwanted spurious effects.

Naturally, a person skilled in the art can undertake further modifications and variations to the invention described above in order to meet specific contingent applicational requirements, said variations and modifications nonetheless falling within the scope of protection defined in the subsequent claims.

Advantages

Compared to a traditional differential pressure drop meter based on a differential transducer, the present invention brings the following technical improvements:

Resolves the problem of "apparent repeatability" in the case of "symmetrical differential measurement".

Resolves the problem of measurement uncertainty in the case of "central-zero differential" measurement, namely with two parts being tested simultaneously.

Resolves the drift in the pneumatic branch of reference in the case of "asymmetrical differential measurement", by means of partial and controlled discharging of the reference branch for test purposes.

Resolves the technical problem of intrinsic lack of safety of traditional differential pneumatic systems.

Achieves greater construction simplicity.

Ensures greater reliability over time.

Offers the possibility of "stepwise" diagnosis of the two measurement branches.

The invention claimed is:

1. A pneumatic leak meter based on absolute pressure drop measurements that compensates for ambient variations and temperature of a part of a test object being measured, as well as mechanical deformations of the part of the test object caused by pressure being applied, and that comprises two pressure drop measurement circuits and associated electronics so that leaks can be measured by subtracting pressure values of the two measuring circuits and associated electronics, comprising:

a common pneumatic valve for pressurizing an object being tested, namely, on a pneumatic pressurization section (1) of said test object, a first circuit with a dedicated pneumatic valve (7) for selectively coupling the first circuit to said pneumatic pressurization section (1) during a pressurization phase and for selectively decoupling the first circuit from the pneumatic pressurization section (1) during a measurement phase, a first pressure meter (2) for first circuit for monitoring the pressurization of the test object; said pressure meter being a relative pressure meter operating relative to ambient temperature;

a first pneumatic line dedicated to the first circuit that connects the pressure meter with the pneumatic pressurization section of the test object, such that the first circuit (7) acts as a first absolute pressure drop measurement circuit for the purpose of measuring decay over time of the test object;

a second circuit with a dedicated pneumatic valve (8) with a second pressure meter (3) operating relative to ambient temperature connected to a second pneumatic line dedicated to the second circuit; such that the second circuit (8) acts as a second absolute pressure drop measurement circuit for the purpose of measuring decay over time of the test object;

Wherein, in the case of a symmetrical differential measurement the second pneumatic line is connected to a reference object being tested in terms of temperature and expansion, said referenced object being a leak-free object; and in the case of an asymmetrical differential measurement, the second pneumatic line is not connected to the reference object;

Wherein in the case an asymmetrical differential measurement, associated electronics (FIG. 2) are configured to acquire both pressure values measured by the first pressure meter and the second pressure meter, and therefore to continuously sample differences between both pressure values; and Wherein, in the case of a symmetrical differential measurement, the associated electronics (FIG. 2) are configured to acquire and save in a permanent data array, a measurement trend of the reference object, and determine, during measurement, a difference in real time between an acquired wave and the saved array, point by point in phase with time, as such ensuring that the resulting differential measurement is free from and unaffected by mechanical stress phenomena and variations in ambient temperature.

2. The pneumatic leak meter of claim 1, wherein the common pneumatic valve for pressurizing an object being tested utilizes industrial air.

3. A method of using the pneumatic leak meter of claim 1 in association with computer software and associated computer hardware for managing calculations comprising the steps of the software:

measures the trend of the reference object at intervals of time to avoid unnecessary mechanical stress and heat accumulation;

tracks variations in ambient temperature;

manages a reservation and execution cycle of the reference object based on percentage parameters of the totality of measurements taken, as well as minimum and maximum times, and takes measurement samples at intervals of time that are long enough not to wear out mechanical characteristics of the referenced object but frequent enough to track ambient variations;

Wherein sampling occurs each time the pneumatic leak meter is turned on so that algorithms on acquired points enables different reference curves acquired to be refined over time and filtered, while avoiding any sudden and unwanted spurious effects.

\* \* \* \* \*